Patented Feb. 23, 1954

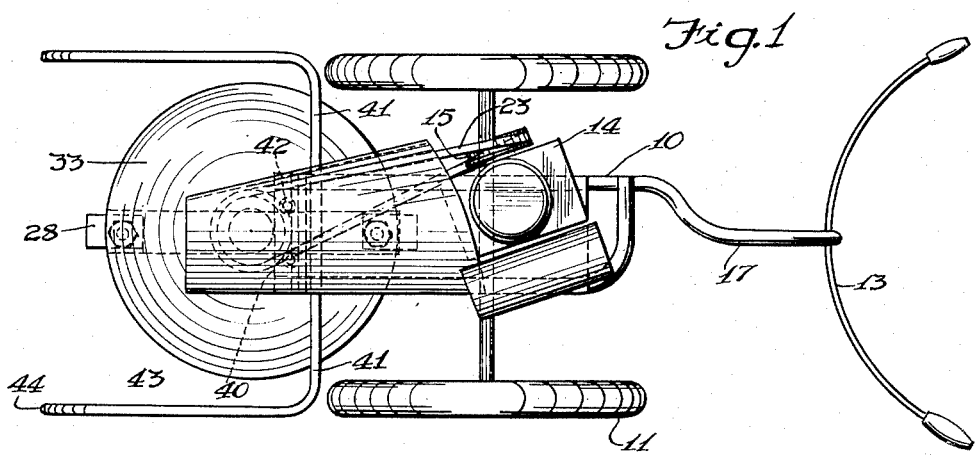
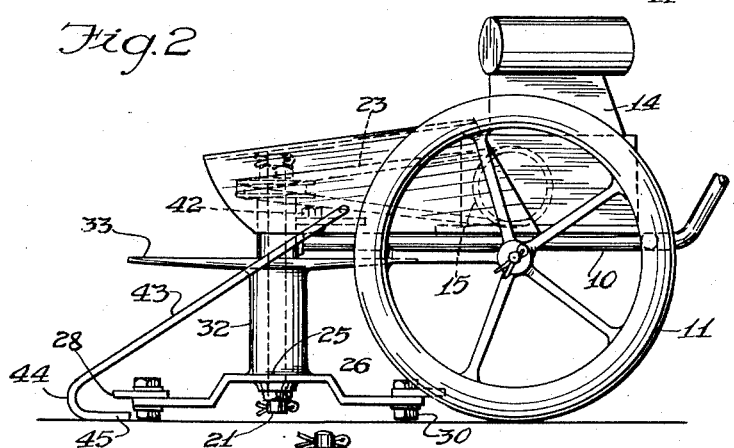
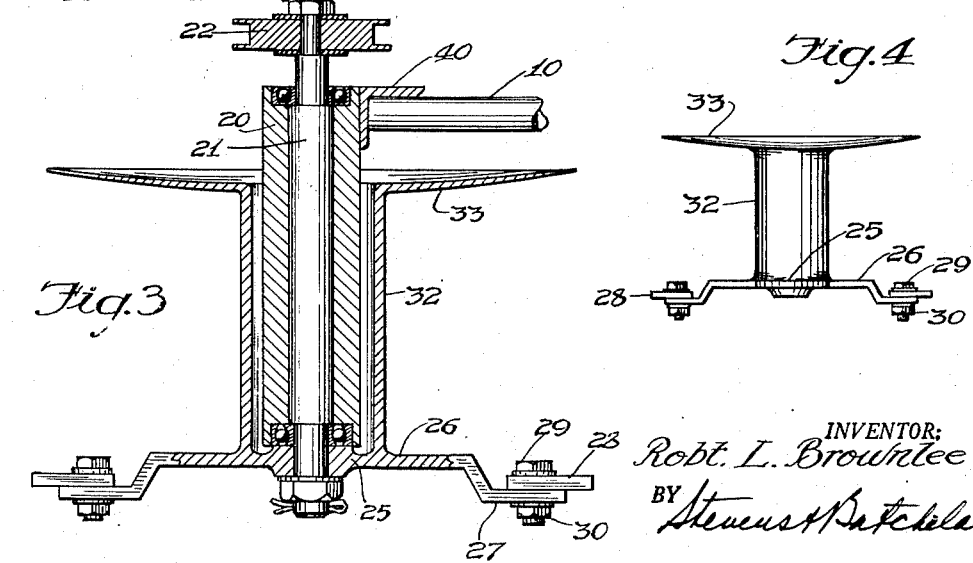

2,669,827

UNITED STATES PATENT OFFICE 2,669,827

CUTTING UNIT FOR POWER WEED CUTTERS

Robert L. Brownlee, Mokena, Ill.

Application January 21, 1952, Serial No. 267,413

5 Claims. (Cl. 56—25.4)

My invention relates to power weed cutters, and more particularly to the rotary units carried by the same for cutting the weeds. Generally, such a unit involves a disc or bar projecting a series of blades and carried by a shaft in a vertical bearing, motion to the shaft being transmitted from the power plant of the weed cutter. However, during the action of the latter, cut weeds, stalks and other loose material tend to wrap around the shaft and its bearing, clog spaces in the latter, and snag the unit to a degree interfering with the rotation or free operation of its shaft. It follows that time must be devoted frequently to loosening, unwrapping and removing the material accumulated on the cutting unit. In view of the unsatisfactory condition described, it is one object of the present invention to improve the cutting unit in a manner to eliminate all influences by the loose material to interfere with the rotation of the cutting unit shaft or with the freedom of its operation.

A further object is to design the cutting unit in the form of a vertical spool whose rotation will disperse and cast aside all loose material rising from the weed cutting zone.

A still further object is to impart a wide spread to the top of the cutting unit, lending it the form of a disc or baffle to prevent the rise of the loose material into the driving gear of the cutting unit and disperse tall weeds that have been cut and are encountered by the disc.

An important object is to construct the cutting unit along lines of rigidity and extreme simplicity.

An additional object is to mount a novel and efficient form of guard on the support of the driving gear for the cutting unit.

With the above objects in view, and any others which may suggest themselves from the description to follow, a better understanding of the invention may be had by reference to the accompanying drawing in which—

Fig. 1 is a top plan view of the weed cutter incorporating the present invention;

Fig. 2 is a side elevation of the main portion thereof;

Fig. 3 is an enlarged vertical section of the cutting unit and its driving gear; and Fig. 4 is a smaller elevation of the cutting unit.

In accordance with the foregoing, specific reference to the drawing indicates the frame of the weed cutter at 10, and the wheels on which it is mounted at 11. The frame has the usual rearward extension 17 terminating with a handle bar 13; and it also carries a power plant 14 having a drive pulley 15.

The driving gear for the cutting unit mainly involves a massive vertical bearing 20 which is welded or otherwise rigidly attached to the front end of the frame 10. A vertical shaft 21 is journaled in the bearing 20 and carries a pulley 22 at the top which receives a belt drive 23 from the power plant pulley 15.

The lower end portion of the shaft 21 passes through the base 25 of the cutting unit 26. The latter is in the form of a cross-bar having downward offsets 27 at its outer ends, such offsets carrying blades 28 freely pivoted by means of bolts 29 and nuts 30. The base 26 of the cutting unit rises with a cylindrical column 32 surrounding the bearing 20; and the upper end of the column is enlarged to form a slightly dished horizontal disc 33.

When the weed cutter is in action, the cutting unit rotates with the blades 28 projecting in the path of the work. As mentioned before, the agitation of the cutting action raises or throws cut weeds and other loose material upwardly into the zone of the cutting unit. However, due to the spool-like form and rotation thereof, the material referred to will be dispersed and thrown clear of the weed cutter. Moreover, stalks that have been cut loose at the bottom will be met by the rotating disc 33 and whisked aside by the same before they tend to settle back into the zone of the cutting unit. In other words, by making the disc as large in diameter as the sweep of the cutting unit, a dispersing medium for the taller weeds is presented concurrently with a cutting medium for the same. While the one-piece construction of the cutting unit lends it ample rigidity, the concave design of the disc 33 further reinforces the unit.

It will be noted that the zone of attachment of the bearing 20 to the mower frame 10 also includes a cross-angle bar 40. The purpose of the bar is for clamping the medial portion 41 of a guard for the cutting unit, bolts 42 and suitable clamping means being provided for this purpose. The portion 41 is rounded at the sides and extended with inclined sections 43 which are made with short rounded bends 44 at the bottom, these terminating with rearward extensions or feet 45. The guard is in one piece, serving against the approach of persons or animals from the side and as a bumper in case a frontal barrier or obstruction is met by the mower.

It will now be apparent that the novel cutting unit is extended in one direction from its base with the functioning parts and in another direction with means to check the tendency of cut weeds, stalks and other loose material developed by the action of the cutting unit to wrap around the driving gear of the cutting unit or clog or snag the same. In other words, the usual stationary tube or bearing in which the cutter shaft rotates is not in the open to furnish an inviting surface for the wrapping of weeds and stalks, but is concealed in the tubular column 32. However, this column is in rotation during the action of the cutter, so that no hold can be obtained by the weeds and stalks engaging it, causing them to be thrown off and dispersed; and this action is duplicated by the top disc 33 in respect to the taller weeds or stalks.

The cutting unit is essentially in one piece and rigidly constituted, serving as an efficient device. Further, the guard 41—43 is also a device in one piece serving both for safety alongside the weed cutter and as a limiting factor to the progress of the same in case of obstructions. Altogether, the cutting mechanism and guard add to the efficiency of the weed cutter in important respects.

While I have described the invention along specific lines, various minor changes or refinements may be made therein without departing from its principle, and I reserve the right to employ all such changes and refinements as may come within the scope and spirit of the appended claims.

I claim:

1. In a power weed cutter having a frame and a vertical depending bearing carried thereby, a cutter shaft rotatable in said bearing and projecting from the lower end thereof, there being a base-incorporating cutter means secured to the lower portion of said shaft and frame-carried drive means for said shaft adjacent the upper end of the latter; the combination of an upstanding hollow and exteriorly uninterrupted column rising from said cutter base and surrounding said depending bearing, said column terminating short of said frame, and a continuous outwardly extending weed deflecting flange surrounding said column adjacent the upper end thereof below said frame and the cutter shaft drive means whereby to protect the latter and said shaft and its bearing from cut weeds.

2. The combination set forth in claim 1, and said column being tubular and said flange disk-form.

3. The combination set forth in claim 1 and the distance between opposite portions of said flange approximating the greatest width of said base-incorporating cutter.

4. The combination set forth in claim 1 and said column being tubular, said flange disk-form, and the latter having an upwardly inclined bottom surface extending in the direction of its outer margins and substantially overlying the base-carried cutter means.

5. The combination set forth in claim 1, and said base having outward extensions, and said extensions having cutter carrying terminals and downwardly and outwardly slanting deflecting portions inwardly of said terminals for directing cut weeds against the rotating base-carried column.

ROBERT L. BROWNLEE.

References Cited in the file of this patent

UNITED STATES PATENTS

| Number | Name | Date |
|---|---|---|
| 384,787 | Richards | June 19, 1888 |
| 483,913 | Freeman | Oct. 4, 1892 |
| 2,245,821 | Poynter | June 17, 1941 |